April 17, 1956
R. A. NESS
2,742,047
DENTAL FLOSS HOLDER
Filed May 15, 1952
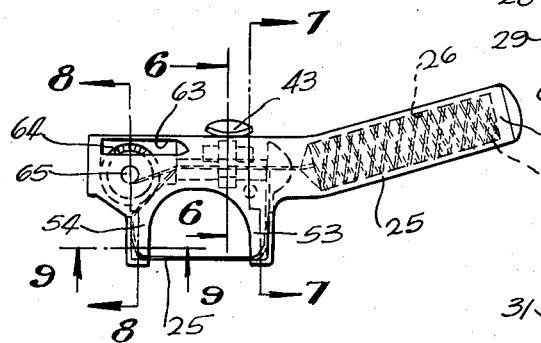
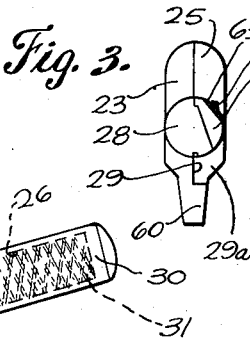
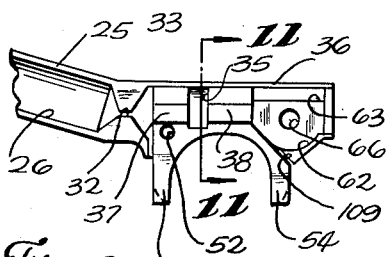
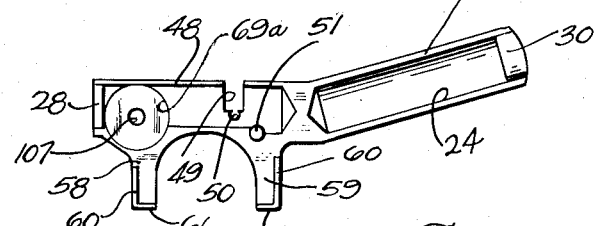
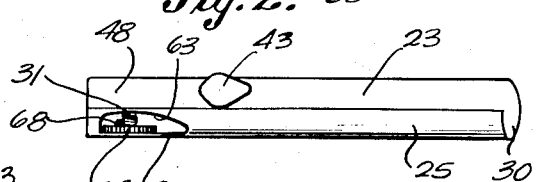
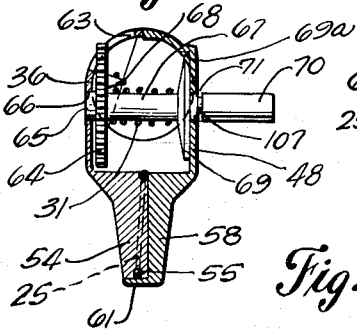
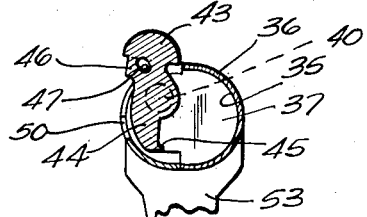
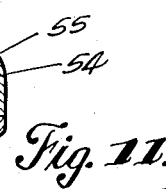
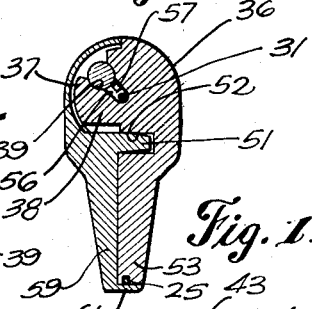
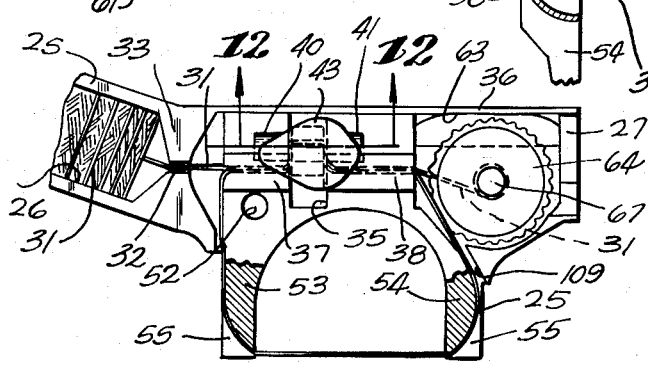
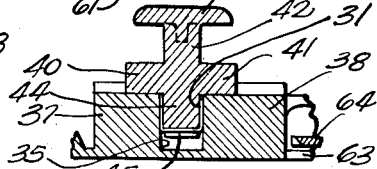
INVENTOR.
ROBERT A. NESS
BY
ATTORNEY.

United States Patent Office 2,742,047
Patented Apr. 17, 1956

2,742,047

DENTAL FLOSS HOLDER

Robert A. Ness, Royal Oak, Mich.

Application May 15, 1952, Serial No. 287,931

7 Claims. (Cl. 132—92)

My invention relates to a new and useful improvement in a dental floss holder and is intended to provide a structure whereby a strip of dental floss may be held in taut condition so that access to the teeth may be easily effected and the dental floss projected between the teeth.

It is an object of the present invention to provide a dental floss holder of this class which will be simple in structure, economical of manufacture, durable, highly efficient in use and of pleasing appearance.

Another object of the invention is the provision of a dental floss holder having a handle-forming magazine in which a roll of dental floss may be positioned and from which it may be threaded around supporting elements and drawn tight and locked in this tightly drawn position.

Another object of the invention is the provision of a dental floss holder whereby the dental floss may be easily and quickly drawn off of the roll of dental floss, so that a new portion will be presented for use.

Other objects will appear hereinafter.

It is recognized that various modifications and changes may be made in the detail of structure illustrated without departing from the invention and it is intended that the present disclosure shall be considered but the preferred embodiment.

Forming a part of this application are drawings in which:

Fig. 1 is a side elevational view of the invention,

Fig. 2 is a top plan view of the invention,

Fig. 3 is a front elevational view of the invention,

Fig. 4 is a plan view of one of the sections of the invention,

Fig. 5 is a fragmentary plan view of the other section of the invention,

Fig. 6 is a sectional view taken on line 6—6 of Fig. 1,

Fig. 7 is a slightly enlarged sectional view taken on line 7—7 of Fig. 1,

Fig. 8 is a slightly enlarged sectional view taken on line 8—8 of Fig. 1,

Fig. 9 is a slightly enlarged sectional view taken on line 9—9 of Fig. 1,

Fig. 10 is an enlarged elevational view of one of the sections with the parts assembled therein, showing parts broken away, parts in side elevation and parts in section, Fig. 11 is a fragmentary view taken on line 11—11 of Fig. 5, Fig. 12 is a fragmentary sectional view taken on line 12—12 of Fig. 10.

It is preferred that the structure be made from a transparent or translucent plastic.

Experience has shown that by forming the article out of plastic the various parts may be made from various colored plastics, thus adding to the ornamental appearance. However, as the description proceeds, it will be obvious that any suitable material may be used and one need not be limited to the use of plastic.

The main structure is formed from two sections and one of the sections is illustrated in Fig. 4 and has a handle-forming portion 23, in which is formed a cavity or recess 24. A cooperating handle-forming section 25, in which is formed the cavity or recess 26, is adapted to seat upon the handle-forming portion 23, so that there is thus provided a chamber or magazine in which a roll 31 of dental floss may be positioned. On the portion 23 is mounted an end wall-forming portion 30. As shown in Fig. 3, the forward portion of the section 25 is provided with a front wall-forming portion 27 abutting a front wall-forming portion 28 carried by the opposite section, the depending portion 29a on one section abutting at 29 with the flange 60 on the leg 58, these parts being described hereinbelow.

When the dental floss is placed in the magazine it may be led through the slit 32 formed in the wall 33, as shown in Fig. 5, so as to be accessible from the forward end of the structure. This forward end comprises a wall 36 which is preferably arcuate. The main body is provided with a slot 35 so that there is thus provided a pair of separate shoulders 37 and 38.

As shown in Fig. 7 and Fig. 11, each of these shoulders is provided with a circular recess 39, which extends the length thereof and which forms a bearing for an arm 40 or 41 (see Fig. 12) which extend laterally outwardly from opposite sides of the stem 42, which is provided on its outer end with a knob 43. The lower or inner end of this stem 44 is provided with a hook-forming portion 45, as shown in Fig. 4. Extending outwardly from the outer side of this stem 44 at the upper end thereof is a rib 46 formed through which is an opening 47 on the inner side.

The other section is provided, as shown in Fig. 4, at its forward end with a wall 48 having a slot 49 formed therein and at the bottom of the slot there is provided a recess circular in formation and larger than a semicircle.

As shown in Fig. 7, one of the sections is provided with a recess 52 and the other is provided with a boss 51 which is adapted to engage in the recess 52 by a very snug fit, so that when the parts are pressed together, removal of the parts is resisted through the engagement of the boss 51 in the recess 52. This recess is provided in the upper portion of the inner face of the leg 53, this leg being extended parallel and in spaced relation to the leg 54, as shown in Fig. 5.

Formed on the outer surface of each of the legs 53 and 54, and on the end surface, is a groove 55, as shown in Fig. 9, in which may engage the strand of dental floss 25.

Formed at the base of each of the shoulders 37 and 38 is a channel 56 in which the strand of dental floss 31 may engage. Projecting into these channels 56 is a boss 57. The boss projects from one side wall of the channel and terminates in spaced relation to the opposed side wall but in such a close relation that it is necessary to draw the strand of dental floss tight in order to pass it under the boss 57. In this manner the strand of dental floss is retained at the bottom of the channel 56.

As shown in Fig. 4, the section illustrated therein is provided with a spaced-apart pair of legs 58 and 59, each of which is provided with the flanges 60 and 61 which are adapted to overlap the legs 53 and 54 so that the flanges 60 and 61 serve to close the groove formed in the outer face of the legs 53 and 54 and thus provide a closed channel through which the dental floss passes.

As shown in Fig. 5, the inner face of the section is illustrated as provided with a recess 62 which extends up to the slots 63 cut in the wall 36, so that a notched wheel 64, positioned in this recess 62, will extend outwardly through the slot 63, as clearly shown in Fig. 1 and in Fig. 8. This notched wheel 64 is mounted on a shaft and one end 65 thereof extends into the opening 66 formed in the wall 36, as shown in Fig. 5. Extending inwardly from the face of the gear 64, as shown in Fig. 8, is a finger 68 which is sufficiently close to the shaft 67 so that the dental floss may be squeezed into clamping relation between this finger 68 and the shaft 67. Mounted on the shaft 67 is a guide disc 69 which seats in a recess 69a formed in the forward portion of the section, as shown in Fig. 4. The shaft 67 projects through this disc 69 and through an opening 107 formed in the wall 48. An extension 70 is formed on the shaft and extends outwardly from the peripheral groove 71. The construction is such that when the parts are placed together a portion 108 of the shaft will engage in the opening 107 and the portion 70 may be broken off at the groove. The purpose of this extension is to facilitate the initial winding of the dental floss on the shaft 67. This, of course, is done before the two sections are placed together to form the closing structure.

When it is desired to assemble the structure the roll of dental floss would be placed in the cavity or recess 26 of the section shown in Fig. 5 or Fig. 10. The strand of dental floss is then led through the slit 32 and through the channels 56 formed at the bottom of each of the shoulders 37 and 38. It is then drawn downwardly through the diagonally directed channel 109 and passed around the leg 54 and thence around the outer surface of the leg 53 and again drawn through the channels 56 formed at the bottom of the shoulders 37 and 38 and then wound upon the shaft 67. The locking member embodying the stem 42 and arms 41 is then placed in position with these arms 40 and 41 lying in the arcuate journal-forming recess 39. The position is such as is illustrated in Fig. 6. The section shown in Fig. 4 is then snapped into position to form a closure. If it is desired to form a closed non-refillable structure the meeting edges of the two sections could be glued or secured together in any other suitable manner. When the two sections are assembled together the flanges 60 and 61 will snap over the legs 53 and 54 and these flanges thus placed under tension. Consequently, if it is not intended to secure the meeting edges of the two sections together permanently the engagement of the flanges with the legs 53 and 54, as well as the engagement of the boss 51 in the recess 52, will suffice to retain the sections together and prevent their undue separation when the structure is in normal use. When the parts have been assembled in this manner the member 44 will project through the slot 49 and the hook 45 will be positioned below the strands of floss which are drawn across the slot 35. The user may then, by rotating the wheel 64, draw the strand of floss, which extends between the legs 53 and 54, to a very taut condition. When this degree of tautness has been reached a rocking downwardly of the member 42 will bring the hook-forming portion 45 up into engagement with strands of floss which span the slot 35 and force these strands upwardly into this slot, thus locking the floss in position. At the same time the rib 46 will travel downwardly of the slot 49 and into the arcuate recess 50, which is circular and formed less than a circle but larger than a semi-circle. As this rib passes through the opposed edges of this recess 50 the opposed edges will snap into the opening 47, thus securely locking the member 44 in fixed position.

The structure is now in position for use and due to its formation and size may be inserted into the mouth and the floss easily and quickly projected between the teeth. When it is desired to use another section of the floss the locking member is rocked in the opposite direction to the position shown in Fig. 6. In this position the floss may be then wound upon the axle 67 by rotating the gear 64, this gear 64 being accessible through the slot 63. Again when the new section of floss is presented for use it may be locked in its taut condition. By bringing the strand around the legs 53 and 54, before passing the same to the shaft 67, considerable friction is met by the strand of floss so that the rotation of the gear 64 will effect a tight stretching of this floss between the legs 53 and 54.

The structure illustrated has proven very efficient in use and the advantages herein brought out are believed to be obviously present.

What I claim is:

1. A dental floss holder of the class described, comprising: a body provided with a pair of spaced-apart legs; a handle forming magazine mounted on and projecting outwardly from one side of said body for reception of a roll of dental floss, said legs having a passage therein for passing a strand of dental floss therethrough to span the distance between said legs; a rotatable roller mounted on said body for rolling said strand thereon after passing of the same through said passages and stretching said strand taut between said legs; a rockable engagement member mounted on said body and rockable into and out of engagement with said strand and adapted, upon rocking into engagement with said strand, for maintaining said strand in taut condition between said legs; and interengagement means on said rockable member and said body for securing said rockable member in strand engaging position.

2. A dental floss holder of the class described, comprising: a body provided with a pair of spaced-apart legs; a handle forming magazine mounted on and projecting outwardly from one side of said body for reception of a roll of dental floss, said legs having a passage therein for passing a strand of dental floss therethrough to span the distance between said legs; a rotatable roller mounted on said body for rolling said strand thereon after passing of the same through said passages and stretching said strand taut between said legs; a rockable engagement member mounted on said body and rockable into and out of engagement with said strand and adapted, upon rocking into engagement with said strand, for maintaining said strand in taut condition between said legs; and interengagement means on said rockable member and said body for securing said rockable member in strand engaging position; and a manual operable member operable for rotating said roller.

3. A dental floss holder of the class described, comprising: a hollow body provided with a pair of legs projecting outwardly from one side thereof in spaced relation, each of said legs having a passage formed therein; a handle forming magazine extending outwardly from one side of said body and adapted for reception of a roll of dental floss, each of said passages adapted for reception of a strand of dental floss led off of said roll; a rotatable roller in said body for rolling said strand thereon and stretching the same taut between said legs; a rockable engagement member in said body for rocking into and out of engagement with said strand and for, upon rocking into engagement with said strand, securing said strand in taut condition between said legs; a head on said rockable member exterior of said body for affording a means for rocking said rockable member; interengaging means between said body and said rockable member for securing said rockable member in strand engaging position.

4. A dental floss holder of the class described, comprising: a hollow body provided with a pair of legs projecting outwardly from one side thereof in spaced relation, each of said legs having a passage formed therein; a handle forming magazine extending outwardly from one side of said body and adapted for reception of a roll of dental floss, each of said passages adapted for reception of a strand of dental floss led off of said roll; a rotatable roller in said body for rolling said strand thereon and stretching the same taut between said legs; a rockable engagement member in said body for rocking into and out of engagement with said strand and for, upon rocking into engagement with said strand, securing said strand in taut condition between said legs; a head on said rockable member exterior of said body for affording a means for rocking said rockable member; interengaging means between said body and said rockable member for securing said rockable member in strand engaging position, there being a slot formed in said body; and a member mounted on said roller and rotatable in unison therewith accessible through said slot for rotating said roller.

5. A dental floss holder of the class described, comprising: a hollow body provided with a pair of legs projecting outwardly from one side thereof in spaced relation; a handle forming magazine extending outwardly from one end of said body and adapted for reception of a roll of dental floss; a roller mounted in said body adjacent the opposite end thereof, said legs being positioned between said roller and said magazine, each of said legs having a passage formed therein a passage in said body leading from said magazine to said roller and communicating with the passages of said legs, said passages being adapted for reception of a strand of dental floss led off of said roll of dental floss for passing said strand around said legs and onto said roller, there being a slot in said body intersecting the passage therein; and a movable member on said body for forcing the strand of floss into said slot for retaining the strand taut.

6. A dental floss holder of the class described, comprising: a hollow body; a handle forming magazine extending outwardly from one end of said body and adapted for reception of a roll of dental floss, said body having a recess formed adjacent its opposite end; a roller rotatably mounted in said recess; a pair of spaced apart legs projecting outwardly from one side of said body between said recess and said magazine; said legs being provided with passages therethrough there being a passage in said body communicating said magazine with said recess and communicating with the passages in said legs for the reception of a strand of dental floss led off of the roll of dental floss, said roller effecting a tensioning of said strand across said legs, there being a slot formed in said body intersecting the passage therein; and a rockable member on said body, accessible from the exterior thereof, and rockable across said passage and into said slot for moving the strand of floss into said slot for retaining said strand between said legs in taut condition.

7. A dental floss holder of the class described, comprising: a hollow body; a handle forming magazine extending outwardly from one end of said body and adapted for reception of a roll of dental floss, said body having a recess formed adjacent its opposite end; a roller rotatably mounted in said recess; a pair of spaced apart legs projecting outwardly from one side of said body between said recess and said magazine; said legs being provided with passages therethrough there being a passage in said body communicating said magazine with said recess and communicating with the passages in said legs for the reception of a strand of dental floss led off of the roll of dental floss, said roller effecting a tensioning of said strand across said legs, there being a slot formed in said body intersecting the passage therein; a rockable member on said body accessible from the exterior thereof and rockable across said passage and into said slot for moving the strand of floss into said slot for retaining said strand between said legs in taut condition; and a rib on said rockable member, there being formed in said body a recess of circular formation, open at one end, and larger than a semicircle, said rib rocking into said circular recess upon movement of said rockable member to a predetermined distance for locking of said rockable member against rocking movement.

References Cited in the file of this patent

UNITED STATES PATENTS

| | | |
|---|---|---|
| 754,841 | Bessonet | Mar. 15, 1904 |
| 2,047,456 | Barsch | July 14, 1936 |
| 2,098,610 | Bluhm | Nov. 9, 1937 |
| 2,450,635 | Dembenski | Oct. 5, 1948 |